United States Patent Office 3,442,935
Patented May 6, 1969

3,442,935
DIRECT PRODUCTION OF ACRYLATE ESTERS
FROM ACRYLIC ACIDS
Lloyd Albert Pine, Baton Rouge, La., Henry George Ellert,
Middletown, N.J., and Harry Vernon Drushel, Baton
Rouge, La., assignors to Esso Research and Engineering Company, a corporation of Delaware
No Drawing. Continuation-in-part of application Ser. No.
297,946, July 26, 1963. This application June 30, 1967,
Ser. No. 650,254
Int. Cl. C07c *69/54, 121/00, 79/38*
U.S. Cl. 260—486
28 Claims

ABSTRACT OF THE DISCLOSURE

This invention relates to the direct production of acrylate esters from unsaturated organic acids of the acrylic acid series: $C_nH_{2n-1}COOH$, by reaction of such an acrylic acid with a suitable alcohol, such as a low molecular weight monohydroxyl alcohol, at temperatures of between about 200–500° C. in the presence of a molybdenum oxide-containing catalyst. The esters produced by this invention are suitable for a wide variety of uses such as, for example, in the manufacture or synthesis of resins, fibers, clear plastics, paints, or other surface coatings.

CROSS-REFERENCE TO OTHER APPLICATIONS

This application is a continuation-in-part of Lloyd A. Pine et al. copending U.S. patent application Ser. No. 297,946, filed on July 26, 1963.

DESCRIPTION OF THE INVENTION

This invention relates to a process for the direct production of acrylate esters from monobasic unsaturated organic acids of the acrylic acid series: $C_nH_{2n-1}COOH$. More particularly, this invention relates to a process for forming esters by reacting such an acrylic acid with an alcohol in the presence of a molybdenum oxide-containing catalyst.

For purposes of describing this invention, it is to be understood that the term "acrylic acid," when not used in a specific sense to denote acrylic acid or its derivatives per se, refers to acids defined by the formula:

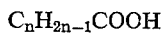

and their derivatives.

Heretofore it has been known in the prior art that the reaction of the carboxyl group of acrylic acids with the hydroxyl group of alcohols can be catalyzed with mineral acids. However, there are certain inherent disadvantages present in the known processes. In order to obtain high conversion, the water of esterification must be removed. Since the mineral acids are quite corrosive, their use necessitates utilization of more expensive materials than is customary in the construction of commercial units. Also, an extra processing step is required, in view of the fact that the acid catalyst must be removed before final purification of the ester product. Moreover, in addition to the foregoing disadvantages, it is to be noted that the mineral acids are not selective catalysts since they also catalyze the formation of polymeric materials and other reactions of the ethylenic bond in the acrylic acid reactant. While part of the above problems have been overcome by the use of solid catalysts, such as copper chromite, copper silicate, activated charcoal, etc., these known catalysts have been unsatisfactory inasmuch as they have generally been characterized by reduced yields of the desired acrylate esters in less than desirable amounts. Moreover, such solid catalysts are of low activity and require severe operating conditions; hence, they are not selective for producing good yields of esters.

The benefits derived by practice of this invention are accomplished by the following process of preparing esters which comprises contacting a monobasic, unsaturated carboxylic acid of the acrylic acid series, having the general formula:

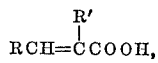

where R and R′ may be the same or different and comprise such inert substituents as, e.g., hydrogen, halogen, keto, amido, nitro, alkyl, alkoxy, cyano, phenyl, alkaryl, or aralkyl, etc., with an alcohol in the presence of a molybdenum oxide-containing catalyst, with said reaction most preferably being effected in the liquid phase. Accordingly, it has now been found that such molybdenum catalysts selectively catalyze the reaction of acrylic acids with alcohols to form esters corresponding to said acids and alcohols in terms of number of carbon atoms and configuration of carbon chains and substituent groups. Thus, without any intent of limiting the scope of the present invention, the reaction between an acrylic acid and a monohydroxy alcohol can be illustrated in accordance with the following equation:

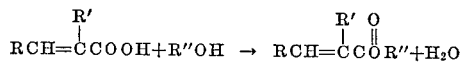

wherein R and R′ are as noted above and R″ is an aliphatic, alicyclic, or aromatic group.

The esterification reaction, as represented by the foregoing equation, is not as uncomplicated as would appear. As a matter of fact, it cannot be effected to give high yields of acrylate esters in high selectivities of in excess of 90% unless a suitable catalyst, such as a molybdenum oxide-containing catalyst, is used. One of the reasons for this is attributable to the formation of byproduct acids of the formula

and byproduct esters of the formula

formed by transfer of hydrogen from the alcohol to the acrylic acid reactant. With employment of a molybdenum oxide-containing catalyst, however, such byproduct formation is greatly reduced, as shown by the very high acrylate selectivities obtained with such catalyst.

The importance of minimizing the amount of byproduct esters formed during esterification of the acrylic acid and alcohol can be seen from the fact that the acrylate and byproduct esters often boil at almost the same temperature or similar temperatures and hence are at best difficult to separate by conventional means, such as distillation. Such byproduct is believed to be formed in the manner shown, using ethanol as an exemplary alcohol, in the following sequence of reactions:

(1) $C_2H_5OH \rightarrow CH_3CHO + H_2$
(2) $2CH_3CHO \rightarrow CH_3CO_2C_2H_5$
(3) $H_2 + Acrylates \rightarrow$ Saturated esters of the formula

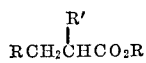

The above sequence is consistent with the fact that methyl alcohol is found to be a poorer hydrogen donor than alcohols of higher molecular weight. Temperature is the main reaction variable affecting the rate of hydrogen transfer; for example, by operating below 400° F., it is possible to consistently keep the selectivity to propionate esters below 0.5 mole percent.

Another side reaction that lowers the selectivity to acrylate esters is the addition of the alcohol to the ethylenic bond of the acrylate esters to form β-alkoxy esters. In the case of esterification with ethyl alcohol and acrylic acid this reaction is dependent on both temperature and pressures. Preferred conditions to minimize its formation over the molybdenum catalyst are at a temperature of about 400° F., and a pressure of about 200 p.s.i.g. However, with ethanol this temperature is high enough to cause significant amounts of hydrogen transfer to take place. Since the separation of β-ethoxyethyl propionate from ethyl acrylate is effected quite readily by distillation, it is better to optimize reaction conditions to minimize the formation of the hard-to-separate ethyl propionate. The most preferred conditions for the esterification of acrylic acid with ethyl alcohol over molybdenum oxide catalyst are temperatures of from about 350–375° F., using reactant feed rates of about 0.1–0.2 v./v./hr., and pressures on the order of about 100–200 p.s.i.g. In the case of esterification with methyl alcohol, operating conditions are not as critical since methanol, being a single carbon alcohol, is a poor hydrogen donor. As long as the temperature does not exceed 400° F. and there is sufficient pressure to maintain at least some liquid phase in the reactor only trace amounts of methyl propionate are formed. The formation of β-methoxymethyl propionate is not significantly affected by varying the reaction conditions within reasonable limits. In general, it may be said for alcohols of even higher molecular weight, such as those of propanol, butanol, pentanol, hexanol, etc., that such alcohols are even more temperature-sensitive than the aforenoted lower molecular weight alcohols and hence temperatures of less than 400° F. are necessary for the higher molecular weight alcohols.

In general, any acrylic acid can be reacted with the alcohol reactant to produce the acrylate esters of the present invention. The preferred acrylic acids of this invention contain from 3 to 20 carbon atoms, inclusive of the carbon content of their substituents when they contain same. Acrylic acids containing the aforenoted substituent groups—which are inert or at least substantially inert—such as keto groups, nitro groups, alkyl groups, alkoxy groups, cyano groups, aryl groups such as phenyl groups, alkaryl groups such as alkylphenyl, aralkyl groups such as benzyl or toluyl, amido groups, halo groups, etc., are also applicable herein. Apart from the alkyl, aryl, or substituted forms thereof, the remaining foregoing substituent groups can consist of the functional group per se, such as, e.g., —C=O, C≡N, —NH₂, —Cl, —Br, —I, etc., or homologs thereof having from 1 to 16 or 17 additional carbon atoms. The acrylic acid reactant can be branched chain, straight chain or cyclic; similarly, it can be aliphatic or aromatic. Accordingly, when the term "acrylic acid" is used herein, it must be clearly understood that the term embraces acrylic acid itself or its derivatives, as well as any acrylic acid of the formula $C_nH_{2n-1}COOH$, unsubstituted or substituted as in the formula

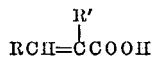

by the above inert substitutents. Thus, exemplary of the acrylic acid derivatives suitable for use in the process of this invention are the following acids: methacrylic, crotonic, tiglic, angelic, and senecoic; and also hexenoic, heptenoic, octenoic, nonenoic, decenoic, undecenoic, dodecenoic, tridecenoic, tetradecenoic, pentadecenoic, hexadecenoic, heptadecenoic, octadecenoic, nonadecenoic, eicosenoic, etc., where in the latter numbered acids ($C_6$–$C_{20}$) the double bond is conjugated with the carboxyl group.

Suitable aromatic acids include, by way of example,

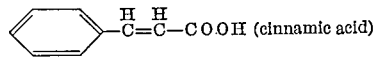

wherein the phenyl group may be substituted with halo, nitro, alkyl, alkoxy, cyano, keto, amido, etc.; and also

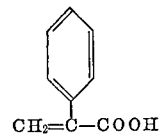

In general, any organic alcohol can be reacted with the above acid reactants to produce the products of the present invention. However, the preferred alcohols of this invention contain from 1 to 30, and most preferably from 1 to 20 carbon atoms. Thus, suitable alcohols include the primary, secondary and tertiary aliphatic, aromatic and heterocyclic mono- and polyhydroxyl alcohols. However, although secondary and tertiary alcohols are operable in the process of the present invention, they are found to be less desirable than the primary alcohols because of their stronger tendency to dehydrate to olefins.

Nonlimiting examples of suitable alcohols include methyl and ethyl alcohol, the linear and branched propyl-, butyl, amyl-, hexyl-, heptyl-, octyl-, nonyl-, decyl-, undecyl-, dodecyl-, tridecyl-, tetradecyl-, pentadecyl-, cetyl-, heptadecyl-, octadecyl-, nonadecyl-, eicosyl-, carnaubyl-alcohols and the like; and also the corresponding alkenols containing from 3 to 20 carbon atoms such as, e.g., propenol, butenol, pentenol, decenol, pentadecenol, eicosenol, etc. Suitable dihydroxy aliphatic alcohols include the glycols and the pinacols; suitable trihydroxy aliphatic alcohols include the glycerols; and suitable polyhydroxy aliphatic alcohols include the tetritols, for example, erythrol, pentaerythritol and the like. Exemplary of the cyclic alcohols are cyclopentanol, cyclohexanol, cycloheptanol, cyclooctanol and the like. Exemplary of useful aromatic alcohols are benzyl alcohol and homologs thereof, such as phenylethyl and phenyl propyl alcohols; cinnamic alcohol, etc.

The present invention may be applied to a specific acid and alcohol of the foregoing classes or mixtures of acids and/or alcohols. However, to be recognized is the fact that when mixtures of acids and/or alcohols are employed, they produce mixtures of esters as products, thereby posing additional separation, and other, problems.

In accordance with the present invention, a catalyst is provided which is not only more active than catalysts heretofore known for the direct esterification of carboxylic acids and alcohols, but is also surprisingly effective for the direct production of acrylate esters. The catalyst employed in the practice of the present invention is suitably a molybdenum oxide catalyst of the general formula $Mo_xO_y$ where $x$ can be 1 or 2 and $y$ can be 1, 2, 3, or 5. The catalyst as normally prepared, however, is a mixture of molybdenum oxides, selected from the group consisting of MoO, $Mo_2O_3$, $MoO_2$, $Mo_2O_5$, and $MoO_3$, in which the major component is $MoO_3$. It is to be understood that any individual molybdenum oxide from the list of those oxides previously enumerated as well as any combination of mixture of such oxides is applicable in the practice of this invention. These catalysts are truly selective in that high selectivities, in excess of 90%, in acrylates produced from direct esterification are accomplished. Furthermore, the molybdenum oxide catalysts used in the process of the instant invention are extremely stable and can be used for protracted periods without apparent loss of activity. For example, it has been found in experimental runs that the activity of said catalysts showed no measurable decline after being used over 800 hours. This property is in contrast to the prior art catalysts, such as, e.g., copper chromite, etc., which are, in general, not stable under the conditions found in the present process and therefore rapidly lose activity with use.

A preferred method by which the preferred catalyst of this invention can be prepared comprises impregnating activated carbon, used as a catalytic support, with ammonium molybdate of reagent grade purity, drying the resultant catalyst under a nitrogen atmosphere at temperatures sufficiently high to promotes drying and removal of excess ammonia but insufficient to accommodate substantial oxidation of such catalyst, and then subjecting the dried catalyst to a mild steaming.

The catalysts used in the present invention can, of course, be supported on inert carriers of any of the readily available types. Thus, examples of carrier materials which can be used as solid support components of the catalysts are the various aluminous and silicious materials of natural or synthetic origin such as bauxite, aluminum oxide, activated alumina, kieselguhr, magnesium oxide, magnesium silicate, barium sulphate, pumice, kaolin, activated carbon, clays, Carborundum, Alundum, etc. However, the non-acidic or weakly acidic carriers are preferred so as to minimize acid catalyzed alcohol dehydration. The catalysts preferably contain 10 wt. percent of the active material supported on a carrier of the type above described, e.g., activated carbon. A preferred molybdenum-oxide catalyst is one having the following general composition: 2–20 wt. percent, preferably 5–15 wt. percent, e.g., 10 wt. percent molybdenum oxide on a carrier of the type above described, e.g., activated carbon. Either powdered, crushed, or "pilled" catalyst is satisfactory if used under proper conditions, e.g., such as those precluding plugging of the reactor outlet, and in the proper reactors, "pilled" catalyst being defined as an activated carbon extrudate, preferably in the form of pellets of ⅛" or larger diameter, to which a source of molybdenum oxide may be added or incorporated, as, e.g., in the aforedescribed method of preparing the preferred catalyst of this invention.

While the preferred catalyst of this invention comprises one or more of the previously described molybdenum oxides, either with or without a carrier or support, it is within the purview of this invention to include in said catalysts other materials, either catalytically active or inactive, such as, e.g., inert fines, including recycle fines, of suitable particle size, etc., or catalytically active materials, such as the metals, or the oxides of such metals, etc., from Group VIB or VIII of the Periodic Table (as defined on page 628 of "Webster's Seventh New Collegiate Dictionary," published by G. & C. Merriam Co., Springfield, Mass., 1965) such as Cr, Mo, W, Fe, Co, Ni, Ru, Rh, Pd, Pt, Os, or Ir. Such additional materials can be present in amounts of from about 10% to about 20% of the total weight of the catalyst. However, it is to be understood that the catalyst employed in his invention, in order to be of suitable utility, must be capable of maintaining an optimum balance between its respective esterification and hydrogenation catalytic activity so as to preclude any excessive hydrogenation activity which would interfere with the esterification function of the catalyst. Accordingly, such noted hydrogenation catalysts as Ni, Pt or Pd, e.g., which also have esterification catalytic activity, when incorporated into the present catalyst must be employed in correspondingly lesser amounts in order to preserve the aforenoted balance between esterification and hydrogenation activity in the final catalyst.

In copending application, Ser. No. 297,946, now U.S. 3,329,826, it is disclosed that a molybdenum sulfide-containing catalyst is an excellent catalyst for promoting direct esterification of carboxylic acids and alcohols. While such a catalyst does in fact provide adequate yields of 80 to 90% acrylate ester when employed in the present process, nevertheless, the selectivities in terms of acrylate product obtained have been less desirable than those obtained with the present molybdenum oxide catalyst, as is shown subsequently in the examples. The reason for this reduced acrylate selectivity obtainable with molybdenum sulfide-containing catalyst is believed due to its higher activity for hydrogen transfer, although it is not desirable to limit the scope of this invention in any way by any theory propounded to account for the differential in acrylate selectivity demonstrated by a molybdenum oxide catalyst as compared with the corresponding molybdenum sulfide-containing catalyst.

The most important reaction conditions employed in the process, whether said process is a batch or continuous operation, are as follows: (a) temperatures of from about 200 to about 500° F., preferably 300 to 450° F., an especially preferred temperature being about 375° F.; and (b) residence times of from about 1 to 20 hours, preferably 5 to 10 hours, an especially preferred residence time being about 8 hours. While elevated pressures are not critically necessary for this process, sufficient pressure, e.g., 0 to 400 p.s.i.g., is usually employed so as to retain at least a portion of the reactants in the liquid phase. The amount of catalyst utilized is from 2 to 100 wt. percent, preferably 20 to 60 wt. percent, an especially preferred amount being about 30 wt. percent, based on the weight of the total reacants, i.e., acid plus alcohol supplied. If a continuous esterification operation is employed, feed rates of reactants over catalyst of about 0.05 w./hr./w. are preferred. The acids and alcohols are preferably employed in substantially equimolar amounts; however, the presence of large molar excesses of one of the reactants is found to have no substantial deleterious effects.

The esters produced by the present invention are highly desirable and, in general, are suitable for use in the manufacture or synthesis of resins, fibers, clear plastics, paints and other coating materials and the like.

Specific applications of the process of the present invention are further illustrated by the examples which follow. In these examples, the feed employed was preblended by mixing the alcohol and acid reactants together in a beaker, usually in a 3.5/1 mole ratio of alcohol to acid. The alcohol used was of the anhydrous form; and when acrylic acid was the acid reactant used, it was of monomer grade. The molybdenum oxide catalyst employed had the following composition: A mixture of molybdenum oxides such as defined on page 10 wherein the weight percent of molybdenum metal was 10 percent of the total catalyst weight, said metal oxides being supported on ⅛" pellets of activated carbon. The reactor used was a single conventional reactor with a 1" I.D. and 24" long. Product analysis was by gas chromatography calibrated with methyl acetate as an internal standard. The weight percent of heavy bottoms was determined both by difference and by weighing the residue from a sample heated for two hours at 70° C. under a 24" vacuum.

Examples 1–6

In these examples a number of experiments were performed in which acrylic acid was esterified with methyl alcohol under various reaction conditions with 250 cc. of pilled molybdenum oxide-containing catalyst previously described. Almost quantitative conversions of the acrylic acid were obtained without removing the water of esterification. In Example 6, where 10 wt. percent water was added to the feed, conversion was suppressed slightly without affecting selectivity. In all cases the formation of methyl propionate was quite low. In Example 5, where the reaction was run at 350° F., it could not even be detected.

TABLE I.—METHYL ACRYLATE FORMATION 3.5 moles of alcohol per mole of acid unsulfided MoO$_x$ on carbon catalyst

| Example | 1 | 2 | 3 | 4 | 5 | 6 |
|---|---|---|---|---|---|---|
| Temperature, °F | 406 | 401 | 400 | 376 | 353 | 402 |
| Pressure, p.s.i.g | 390 | 100 | 50 | 200 | 200 | 50 |
| Feed rate, v./v./hr | 0.44 | 0.19 | 0.17 | 0.3 | 0.22 | 0.21 |
| Conversion | 98.2 | 100.0 | 99.8 | 99.9 | 99.0 | [1] 90.2 |
| Selectivity to— | | | | | | |
| Methyl acrylate | 81.9 | 88.0 | 88.7 | 87.5 | 84.1 | 87.1 |
| Methyl propionate | 0.2 | 0.2 | Trace | Trace | 0.0 | 0.0 |
| B-Methoxypropionate | 13.5 | 11.8 | 11.0 | 12.5 | 12.0 | 10.6 |
| Bottoms | 4.4 | 0.0 | 0.3 | 0.0 | 4.0 | 2.3 |

[1] 10 wt. percent H$_2$O added to feed.

Examples 7–11

In these examples, acrylic acid was esterified with ethyl alcohol. These reaction conditions were used as standard for measuring catalyst activity. It can be seen that the activity of the catalyst as measured by the conversion of acrylic acid did not decline after more than 800 hours' use. In Example 11, acrylic acid was used in excess rather than the alcohol. It can be seen that the process is operable with either reactant in excess although there is more heavy polymeric material formed when the acid is in excess.

These data show that at equivalent reaction conditions both catalysts have equivalent esterification activity but that the oxide catalyst forms less of the undesirable propionate esters.

Example 13

This example is similar to Example 12 except that each catalyst is unsulfided molybdenum oxide on a carbon support and that ethanol is used. These data show that as the reaction temperature is increased from about 350 to over 400° F., the yield of ethyl propionate increases. Thus it is

TABLE II

| Example | 7 | 8 | 9 | 10 | 11 |
|---|---|---|---|---|---|
| Catalyst age, hrs | 42 | 66 | 787 | 811 | 835 |
| Operating conditions: | | | | | |
| Temperature, °F | 402 | 398 | 403 | 402 | 401 |
| Pressure, p.s.i.g | 400 | 400 | 400 | 400 | 400 |
| Feed rate, v./v./hr | 0.54 | 0.48 | 0.48 | 0.49 | 0.50 |
| Alcohol/acid mole ratio | 3.5 | 3.5 | 3.5 | 3.5 | 0.29 |
| Material balance, wt. percent | 91.6 | 92.2 | 98.7 | 100.6 | 98.0 |
| Conversion, mole percent | 81.1 | 85.7 | 80.3 | 82.5 | 89.6 |
| Selectivity, mole percent: | | | | | |
| Ethyl acrylate | 89.8 | 85.9 | 90.2 | 88.2 | 67.7 |
| Ethyl propionate | 0.9 | 1.0 | 0.3 | 0.2 | 0.0 |
| B-Alkoxy ester | 7.4 | 10.1 | 7.5 | 10.0 | 0.8 |
| Propionic acid | 0.0 | 0.0 | 0.0 | 0.0 | 0.4 |
| Bottoms | 1.9 | 3.0 | 1.9 | 1.6 | 3.14 |

Example 12

This example compares the results of acrylic acid esterification, using ethanol, obtained with, respectively, a molybdenum oxide catalyst and a sulfided molybdenum catalyst. The sulfided catalyst was prepared by passing a stream of 10% hydrogen sulfide in hydrogen over the molybdenum oxide catalyst at 700° F. for 5 to 6 hours. The alcohol/acid mole ratio was 3.5.

necessary to operate below 40° F. to consistently keep the selectivity to ethyl propionate below 0.5 mole percent. The alcohol/acid mole ratio was 3.5.

TABLE IV

| Temperature, °F | 351 | 353 | 378 | 375 | 398 | 403 |
|---|---|---|---|---|---|---|
| Pressure, p.s.i.g | 100 | 100 | 100 | 100 | 200 | 200 |
| Feed rate, v./v./hr | 0.13 | 0.14 | 0.15 | 0.17 | 0.26 | 0.23 |
| Conversion | 93.9 | 95.0 | 98.1 | 88.4 | 100.0 | 100.0 |
| Selectivity to— | | | | | | |
| Ethyl acrylate | 93.6 | 89.5 | 93.1 | 91.3 | 96.9 | 96.2 |
| Ethyl propionate | Trace | Trace | 0.3 | Trace | 0.8 | 0.9 |
| B-Ethoxypropionate | 6.4 | 9.3 | 6.6 | 8.7 | 2.3 | 2.8 |
| Bottoms | 0.0 | 1.2 | 0.0 | 0.0 | 0.0 | 0.1 |

Examples 14–17

These examples are similar to Example 13 except that the acid is methacrylic and that ethanol and methanol, respectively, were used. The alcohol/acid ratio was 3.5. The results are shown in Table V.

TABLE III

| | Molybdenum Sulfide-Containing Catalyst | | | Unsulfided-Molybdenum Oxide Catalyst | | |
|---|---|---|---|---|---|---|
| Temperature, °F | 400 | 376 | 352 | 400 | 374 | 351 |
| Pressure, p.s.i.g | 400 | 100 | 100 | 400 | 100 | 100 |
| Feed rate, v./v./hr | 0.48 | 0.29 | 0.15 | 0.48 | 0.19 | 0.13 |
| Conversion, mole percent | 81.4 | 87.0 | 93.0 | 85.7 | 91.9 | 93.9 |
| Selectivity to— | | | | | | |
| Ethyl acrylate | 84.0 | 94.0 | 85.2 | 85.9 | 91.0 | 93.6 |
| Ethyl propionate | 5.0 | 0.6 | 0.7 | 1.0 | 0.0 | 0.0 |
| B-Alkoxy ester | 5.7 | 5.5 | 4.2 | 10.1 | 9.0 | 6.4 |
| Bottoms | 5.8 | 0.0 | 11.0 | 3.0 | 0.0 | 0.0 |

TABLE V

| Example | 14 | 15 | 16 | 17 |
|---|---|---|---|---|
| Alcohol | Methyl | | Ethyl | |
| Temperature, °F | 350 | 400 | 350 | 400 |
| Pressure, p.s.i.g | 400 | 400 | 400 | 400 |
| Feed rate, v./v./hr | .21 | .20 | .19 | .22 |
| Conversion | 94.2 | 99.6 | 95.7 | 98.9 |
| Selectivity to— | | | | |
| Acrylate ester | 89.0 | 88.4 | 93.2 | 89.8 |
| Iso butyrate ester | 0.0 | 0.0 | Trace | 0.1 |
| B-Alkoxy ester | 9.8 | 7.9 | 5.4 | 6.2 |
| Iso butyric acid | 0.0 | 0.0 | 0.0 | 0.0 |
| Bottoms (as polyester) | 1.2 | 3.7 | 1.4 | 3.9 |

While the acrylic acid employed was a substituted one, it can be expected that other substituted acrylic acids whose substituents were inert to the reactions being effected would behave in a similar fashion.

Examples 18–19

These examples are similar to Examples 1–6 except that n-butanol was used as the alcohol feed. The alcohol to acid mole ratio was 3.5. It can be seen that this alcohol is a better hydrogen donor than either ethanol or methanol. However, by operating at lower temperatures, selectivity to butyl propionate can be kept below 0.5 mole percent.

TABLE VI

| Example | 18 | 19 |
|---|---|---|
| Temperature, °F | 400 | 350 |
| Pressure | 400 | 400 |
| Feed rate, v./v./hr | 0.47 | 0.21 |
| Conversion, mole percent | 94.2 | 97.9 |
| Selectivity to— | | |
| Acrylate ester | 87.3 | 85.9 |
| Propionate ester | 2.3 | 0.4 |
| β-Alkoxy ester | 6.2 | 7.4 |
| Bottoms | 4.2 | 6.3 |

While n-butanol was used as the alcohol reactant in these Examples (18 and 19), it can be expected that the higher molecular weight alcohols, which are known to behave in a manner similar to that of n-butanol during esterification, would afford similar results to those shown in Table VI.

It will be understood that the foregoing description is merely illustrative of preferred embodiments and specific examples of the present invention and that variations may be made in such embodiments and examples by those skilled in the art without departing from the spirit and purview thereof.

What is claimed is:

1. A process for producing acrylate esters which comprises contacting a monobasic, unsaturated carboxylic acid having from 3 to 20 carbon atoms and of the formula:

$$R-CH=\overset{R'}{\underset{|}{C}}-COOH$$

where R and R' are selected from the group consisting of hydrogen, alkyl, and aryl radicals with an organic alcohol having from 1 to 20 carbon atoms at temperatures of from about 200 to about 500° F., substantially in the liquid phase, and in the presence of a molybdenum oxide-containing catalyst.

2. The process of claim 1 in which the amount of catalyst utilized is from about 2 to 60 wt. percent based on the total amount of the reactants.

3. The process of claim 1 in which the catalyst is supported on an inert carrier.

4. The process of claim 1 in which the temperature is from about 300 to about 450° F.

5. A process for the direct production of acrylate esters which comprises contacting an acrylic acid containing from 3 to 20 carbon atoms and having the formula:

$$R-CH=\overset{R'}{\underset{|}{C}}-COOH$$

wherein R and R' are selected from the group consisting of hydrogen, alkyl, and aryl radicals with an organic alcohol containing from 1 to 20 carbon atoms at temperatures of from 300 to 450° F., substantially in the liquid phase, and in the presence of a catalyst comprising a catalytic amount of a molybdenum oxide material selected from the group consisting of oxides of molybdenum and mixtures thereof.

6. The process of claim 5 in which the amount of catalyst utilized is from about 2 to about 60 wt. percent based on the total amount of the reactants.

7. The process of claim 5 in which the mole ratio of acid to alcohol is from about 0.2 to about 5.

8. The process of claim 5 in which the catalyst is supported on an inert carrier.

9. The process of claim 8 in which the carrier is a material selected from the group consisting of activated carbon, alumina, kieselguhr, pumice, silica, and magnesium oxide.

10. The process of claim 5 in which said acid is acrylic acid.

11. The process of claim 5 in which the alcohol is selected from the group consisting of methanol, ethanol, n-propyl alcohol, n-butyl alcohol, iso butyl alcohol, and mixtures thereof.

12. The process of claim 5 in which said contacting is effected at least partially in the liquid phase.

13. A continuous process for the direct production of acrylate esters which comprises continuously contacting an acrylic acid containing from 3 to 20 carbon atoms and having a formula $$R-CH=\overset{R'}{\underset{|}{C}}-COOH$$

wherein R and R' are selected from the group consisting of hydrogen and alkyl with an organic alcohol containing from 1 to 20 carbon atoms at temperatures of from about 200 to 500° F., substantially in the liquid phase and in the presence of a molybdenum oxide-containing catalyst.

14. The process of claim 13 in which said catalyst is supported on an inert carrier.

15. The process of claim 13 in which said acid is acrylic acid.

16. The process of claim 13 in which said alcohol is selected from the group consisting of methyl-, ethyl-, n-propyl-, n-butyl-, and isobutyl-alcohols and mixtures thereof.

17. The process of claim 13 in which the amount of said material is from about 2 to about 60 wt. percent based on the total amounts of reactants.

18. The process of claim 13 in which said reactants are introduced at a rate of reactant over said catalyst of from 0.05 to 2.0 w./hr./w.

19. The process of claim 13 in which said catalyst comprises a molybdenum oxide material selected from the group consisting of oxides of molybdenum and mixtures thereof.

20. The process of claim 19 in which the catalyst comprises said material on activated carbon.

21. A process for producing acrylate esters which comprises contacting a monobasic, unsaturated carboxylic acid selected from the group consisting of acrylic acid and methacrylic acid with an organic alcohol selected from the group consisting of methanol, ethanol, n-propanol, n-butanol, isobutanol, and mixtures thereof at temperatures from about 300 to 400° F. in the presence of a catalyst comprising a catalytic amount of a molybdenum oxide material selected from the group consisting of oxides of molybdenum and mixtures thereof, said contacting being effected at least partially in the liquid phase.

22. The process of claim 21 in which the catalyst is supported on an inert carrier.

23. The process of claim 22 in which said carrier is activated carbon.

24. The process of claim 23 in which the amount of catalyst utilized in from about 2 to 60 wt. percent based on the total amount of the reactants.

25. The process of claim 11 wherein said acid is selected from the group consisting of acrylic acid and methacrylic acid.

26. The process of claim 5 wherein said acid is methacrylic acid.

27. The process of claim 16 wherein said acid is selected from the group consisting of methacrylic acid and acrylic acid.

28. The process of claim 13 wherein said acid is methacrylic acid.

References Cited

UNITED STATES PATENTS

| | | | |
|---|---|---|---|
| 1,819,818 | 8/1931 | Jaeger | 260—476 |
| 2,521,742 | 9/1950 | Paterson | 260—410.9 |
| 2,965,660 | 12/1960 | Heise et al. | 260—410.9 |
| 3,329,826 | 7/1967 | Pine et al. | 260—410.9 |

OTHER REFERENCES

Andrianova et al.: Chemical Abstracts, vol. 55: 15,075 (1961).

LORRAINE A. WEINBERGER, *Primary Examiner.*

ALBERT P. HALLUIN, *Assistant Examiner.*

U.S. Cl. X.R.

260—410.9, 465, 465.4, 469, 471, 473, 482, 483, 484